A. KÖHLER.
LIGHTING SYSTEM FOR CINEMATOGRAPHS.
APPLICATION FILED AUG. 13, 1921.
1,428,103. Patented Sept. 5, 1922.
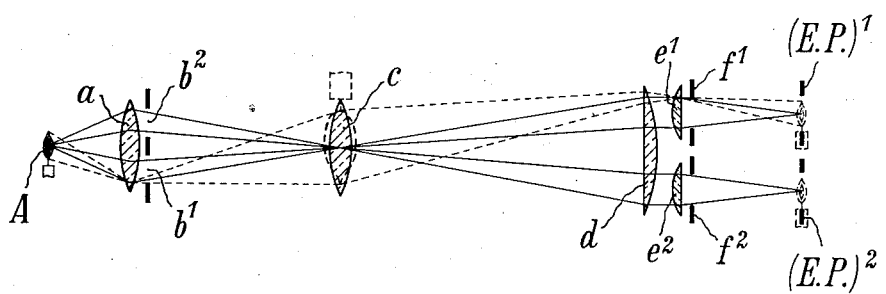
Inventor:
August Köhler.

Patented Sept. 5, 1922.

1,428,103

UNITED STATES PATENT OFFICE.

AUGUST KÖHLER, OF JENA, GERMANY, ASSIGNOR TO THE FIRM CARL ZEISS, OF JENA, GERMANY.

LIGHTING SYSTEM FOR CINEMATOGRAPHS.

Application filed August 13, 1921. Serial No. 492,127.

(GRANTED UNDER THE PROVISIONS OF THE ACT OF MARCH 3, 1921, 41 STAT. L., 1313.)

*To all whom it may concern:*

Be it known that I, AUGUST KÖHLER, a citizen of the German Empire, residing at Jena, Germany, have invented a new and useful Lighting System for Cinematographs (for which I have filed applications in Germany April 20, 1918; Switzerland, June 11, 1920, Patent No. 87,589; Italy, June 28, 1920; England, July 5, 1920; and France, July 9, 1920), of which the following is a specification.

The present invention relates to lighting systems for cinematographs, which are intended for forming an image of a source of light in the entrance pupil of a projecting system consisting of a plurality of objectives which are arranged side by side, and an image of an image-window, in the vicinity of the image-field. In the new lighting system there is, on the one hand, placed behind a condenser system a collective lens system, which lies approximately at the locus of the image of the source of light formed by the condenser system, and images the exit pupil of the condenser approximately in the plane of the film-window, and, on the other hand, there is disposed behind this collective lens system, immediately adjacent to the film-window, an auxiliary condenser system which is divided into two parts. The front part consists of a collective lens the front focal point of which lies at the locus of the collective system (or at the locus of the image of the source of light formed by the condenser system, in the case of the said image not lying exactly at the locus of the collective system). The hinder part consists of a plurality of collective lenses equal in number to the projecting objectives, each of which lenses images in the entrance pupil of the appertaining projecting objective the image of the source of light formed by the condenser system.

The annexed drawing shows a constructional example of the invention in axial section, in which example the projecting system consists of two objectives.

The source of light, which is indicated by the flame of a candle, is marked A, the entrance pupils of the two objectives are marked $(E. P.)^1$ and $(E. P.)^2$ respectively, and the condenser system, $c$. Immediately behind the said system there is disposed a diaphragm provided with two openings $b^1$ and $b^2$. The collective system is marked $c$. The auxiliary condenser system consists of a large collective lens $d$ and two small collective lenses $e^1$ and $e^2$. The front focal point of the lens $d$ lies at the locus of the collective system $c$, the back focal point of the lens $e^1$ at the locus of the entrance pupil $(E. P.)^1$ and that of the lens $e^2$ at the locus of the entrance pupil $(E. P.)^2$. A film-window $f^1$ is disposed immediately behind the lens $e^1$, and a film-window $f^2$ immediately behind the lens $e^2$. The lens $c$ forms an image each of the two diaphragm openings $b^1$ and $b^2$ on the film-windows $f^1$ and $f^2$ respectively, the lenses $d$, $e^1$ and $e^2$ thereby being practically without effect. The lens $a$ forms an image of the source of light A at the locus of the lens $c$. Of this latter image the lens $d$ forms an image along with the lens $e^1$ at the locus of the entrance pupil $(E. P.)^1$, and along with the lens $e^2$ at the locus of the entrance pupil $(E. P.)^2$.

I claim:

In a lighting system for cinematographs having a projecting system which consists of a plurality of objectives disposed side by side, a source of light, a condenser system, a collective lens system, lying approximately at the locus of the image of the source of light, formed by the said condenser system, a film-window and an auxiliary condenser system disposed behind the said collective lens system immediately adjacent to the said film-window, the said collective system imaging the exit pupil of the condenser system approximately in the plane of the film-window, the said auxiliary condenser system consisting of two parts, the front part being a collective lens, the front focal point of which lies at the locus of the said collective system, whilst the hinder part consists of a pluralitiy of collective lenses equal in number to the projection objectives, each of which lenses is adapted to image in the entrance pupil of the appertaining projection objective the image of the said source of light formed by the said condenser system.

AUGUST KÖHLER.